(12) United States Patent
Sung (10) Patent No.: US 7,443,644 B2
(45) Date of Patent: Oct. 28, 2008

(54) CIRCUIT FOR PREVENTING MALFUNCTION OF ARC FAULT DETECTION DEVICE

(76) Inventor: Sam Kyoung Sung, #1303., 115-dong, LG jaei 1st Apt. Sinbong-dong, Yongin-si, Gyeonggido, 449-533 (KR)

( * ) Notice: Subject to any disclaimer, the term of this patent is extended or adjusted under 35 U.S.C. 154(b) by 437 days.

(21) Appl. No.: 11/352,112

(22) Filed: Feb. 9, 2006

(65) Prior Publication Data
US 2007/0183103 A1    Aug. 9, 2007

(51) Int. Cl.
*H02H 3/00* (2006.01)
(52) U.S. Cl. ......................................................... 361/42
(58) Field of Classification Search ..................... 361/42
See application file for complete search history.

(56) References Cited

U.S. PATENT DOCUMENTS 6,556,397 B2 * 4/2003 Kim et al. .................... 361/42
6,999,289 B2 * 2/2006 Macbeth et al. ................ 361/5
7,282,924 B1 * 10/2007 Wittner ...................... 324/536
2004/0263183 A1 * 12/2004 Naidu et al. ................ 324/536

FOREIGN PATENT DOCUMENTS

KR    10-2004-59272    11/2004

* cited by examiner

*Primary Examiner*—Michael J Sherry
*Assistant Examiner*—Scott Bauer
(74) *Attorney, Agent, or Firm*—Jordan and Hamburg LLP (57) ABSTRACT

Disclosed herein is a circuit for preventing a malfunction of an arc fault detection device for determining whether an arc fault occurs through a low-current route or a high-current route, classified according to the magnitude of load current, using a source voltage applied to a conductor, which sets an operational prohibition range so as to prevent the malfunction of determining a pseudo-arc signal attributable to various combinations of loads to be an actual arc signal and interrupting a circuit, thus being capable of more precisely controlling the detection of the arc signal.

6 Claims, 5 Drawing Sheets

CIRCUIT FOR PREVENTING MALFUNCTION OF ARC FAULT DETECTION DEVICE

BACKGROUND OF THE INVENTION

The present invention relates generally to a device for detecting an arc fault and, more particularly, to a circuit for preventing a malfunction of the arc fault detection device for determining whether an arc fault occurs through a low-current route or a high-current route, classified according to the magnitude of load current, using a source voltage applied to a conductor, which sets an operational prohibition range so as to prevent the malfunction of determining a pseudo-arc signal attributable to various combinations of loads to be an arc signal and interrupting a circuit, thus being capable of more precisely controlling the detection of the arc signal.

As is generally known, an arc fault (series arc, parallel arc, or ground arc), which occurs over electrical wiring, is a phenomenon that occurs due to a physical or electrical fault, such as the aging or damage of wiring, an insulation fault or overcurrent. Such an arc fault particularly causes fires, so that, recently, the use of an arc fault protection interrupter that detects an arc fault and interrupts electric products in a circuit manner have become mandatory in the United States.

One consideration for the detection of an arc fault is to distinguish an arc signal from signals similar thereto, that is, a signal generated at the time of start of electric equipment (hereinafter referred to as a 'start signal') and a signal caused by a dimmer (hereinafter referred to as a 'dimmer signal').

A conventional arc fault detector occasionally interrupts a circuit because it mistakes a start or dimmer signal, which is a pseudo-arc signal, for an actual arc fault signal.

Accordingly, in order to prevent such a mistake, efforts have been concentrated on producing an arc fault detector that can distinguish a pseudo-arc signal from an actual arc signal and then interrupt a circuit.

However, a commercially available product can detect an arc signal using a scheme of detecting current flowing through a connector between a power source and a load and determining whether an arc fault occurs, but still allows the possibility that signals similar to the above-described arc signal are also detected and, thus, a malfunction occurs. Furthermore, the conventional arc fault detector detects the arc signal through a single route without distinguishing low current from high current, so that many problems occur at the time of setting a frequency band and circuit interruption time (the interval between the time at which an arc occurs and the time at which a circuit is interrupted).

In other words, the conventional arc fault detector is available commercially in the form of a product using a scheme of detecting parallel and ground arcs that occur due to a large load current and then interrupting a circuit, but is not available commercially in the form of a product using a scheme of detecting an arc below the rated current of an interrupter and then interrupting a circuit.

The reason for this is that load signals similar to the arc signal are various, and the frequency and magnitude of a detected signal vary according to the connection of a plurality of loads, not a single load, so that it is difficult to distinguish the pseudo-arc signals from an actual arc signal, therefore the circuit interruption time, based on arc generation, increases.

Accordingly, in order to solve this problem, Korean Unexamined Pat. Appl. No 10-2004-59272 was filed by the present applicant.

The technology relates to an arc fault detection device that can eliminate a malfunction attributable to the conventional current detection scheme by detecting source voltage applied to a conductor and determines whether an arc faults occur, and can not only prevent malfunctions caused by pseudo-arc signals but also shortening the circuit interruption time according to the size of a load by determining whether arc faults occur through two routes classified according to the magnitude of load current, thus considerably reduce the danger of fire.

Accordingly, due to the advent of this technology, advanced technology that easily detects an arc occurring below a rated value as well as a high load current above the rated value and quickly interrupt a circuit has been provided.

The present invention is combined with the above-described technologies, and is a technology for eliminating the malfunction of determining a pseudo-arc signal attributable to various (a plurality of) combinations of loads to be an actual arc signal and interrupting a circuit, that is, a malfunction of an interrupter that occurs due to unnecessary tripping.

BRIEF SUMMARY OF THE INVENTION

Accordingly, the present invention has been made keeping in mind the above problems occurring in the prior art, and an object of the present invention is to provide a circuit for preventing a malfunction of an arc fault detection device for determining whether an arc fault occurs through a low-current route or a high-current route, classified according to the magnitude of load current, using a source voltage applied to a conductor, which sets an operational prohibition range so as to prevent the malfunction of determining a pseudo-arc signal attributable to various combinations of loads to be an actual arc signal and interrupting a circuit, thus being capable of more precisely controlling the detection of the arc signal.

Another object of the present invention is to provide a circuit for preventing a malfunction of an arc fault detection device that enables the implementation of an Arc Fault Circuit Interrupter (AFCI), which must include a function of detecting an overload or a short circuit as well as a function of detecting an arc signal according to regulations.

In order to accomplish the above object, the present invention provides a circuit for preventing a malfunction of an arc fault detection device, the arc fault detection device having a voltage detection unit for detecting variation in voltage over time for a power source, first and second arc detection units for detecting whether an arc fault occurs through a low-current route (setting of a low-current frequency band) or a high current route (setting of a high current frequency band), based on the variation in voltage detected by the voltage detection unit, the first arc detection unit outputting a corresponding arc detection signal when the arc detection is performed through the low-current route, and the second arc detection unit outputting a corresponding arc detection signal when the arc detection is performed through the high current route, and a circuit interruption unit for interrupting an electrical connection between the power source and a load in response to the arc detection signals output from the first and second arc detection units, the circuit including a current detection unit disposed on a conductor between the power source and the load, and configured to detect variation in current over time; a current saturation setting unit for setting the current saturation time of the signal detected by the current detection unit according to load; a first amplification unit for amplifying a signal output from the current saturation setting unit in a non-inverted manner; a second amplification unit for amplifying a signal output from the current saturation setting unit in an inverted manner; a full-wave rectification unit for outputting a full-wave signal by combining half-wave signals output from the first and second amplification units; a third amplification unit for amplifying the signal output from the full-wave rectification unit; a first Direct Current (DC) conversion unit for converting a signal output from the third amplification unit into a DC signal; a first comparison unit for comparing the signal output from the first DC conversion unit with a first reference voltage, determining the output signal of the first DC conversion unit to be the pseudo-arc signal of the low-current route when the output signal is lower than the first reference voltage, and generating an output based on the determination; a first signal conversion unit for interrupting the output signal of the first arc detection unit when the output based on the determination related to the pseudo-arc signal is generated by the first comparison unit; a second DC conversion unit for converting the output signal of the full-wave rectification unit into a DC signal; a second comparison unit for comparing the signal output from the second DC conversion unit with a second reference voltage, determining the output signal of the second DC conversion unit to be the pseudo-arc signal of the high-current route when the output signal is lower than the second reference voltage, and generating an output based on the determination; a second signal conversion unit for interrupting the output signal of the second arc detection unit when the output based on the determination related to the pseudo-arc signal is generated by the second comparison unit; and a current branch switching unit configured to interrupt the output of the first comparison unit when an output resulting from the pseudo-arc signal occurs from the second comparison unit, and not to interrupt the output of the first comparison unit when an output resulting from the pseudo-arc signal does not occur from the second comparison unit, after a current route is set according to low current or high current.

In addition, the present invention provides a circuit for preventing the malfunction of an arc fault detection device, the circuit including a current detection unit disposed on a conductor between the power source and the load and configured to detect variation in current over time; a current saturation setting unit for setting the current saturation time of the signal detected by the current detection unit according to load; a first amplification unit for amplifying a signal output from the current saturation setting unit in a non-inverted manner; a second amplification unit for amplifying a signal output from the current saturation setting unit in an inverted manner; a full-wave rectification unit for outputting a full-wave signal by combining half-wave signals output from the first and second amplification units; a third amplification unit for amplifying the signal output from the full-wave rectification unit; a first DC conversion unit for converting a signal output from the third amplification unit into a DC signal; a first comparison unit for comparing the signal output from the first DC conversion unit with a first reference voltage, determining that an overload has occurred over a low-current route, that is, that an overload has occurred over a low load route if a current equal to or lower than 200% of a rated current is detected, when the output signal of the first DC conversion unit is lower than the first reference voltage, and outputting an circuit interruption signal; a second DC conversion unit for converting the output signal of the full-wave rectification unit in a DC signal; and a second comparison unit for comparing the signal output from the second DC conversion unit with a second reference voltage, determining that an overload has occurred over a high-current route when a current ranging from 200% to 400% of the rated current is detected, when the output signal of the second DC conversion unit is lower than the second reference voltage, and outputting an circuit interruption signal.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

Preferred embodiments of the present invention are described with reference to the accompanying drawings below.

Figure 1:
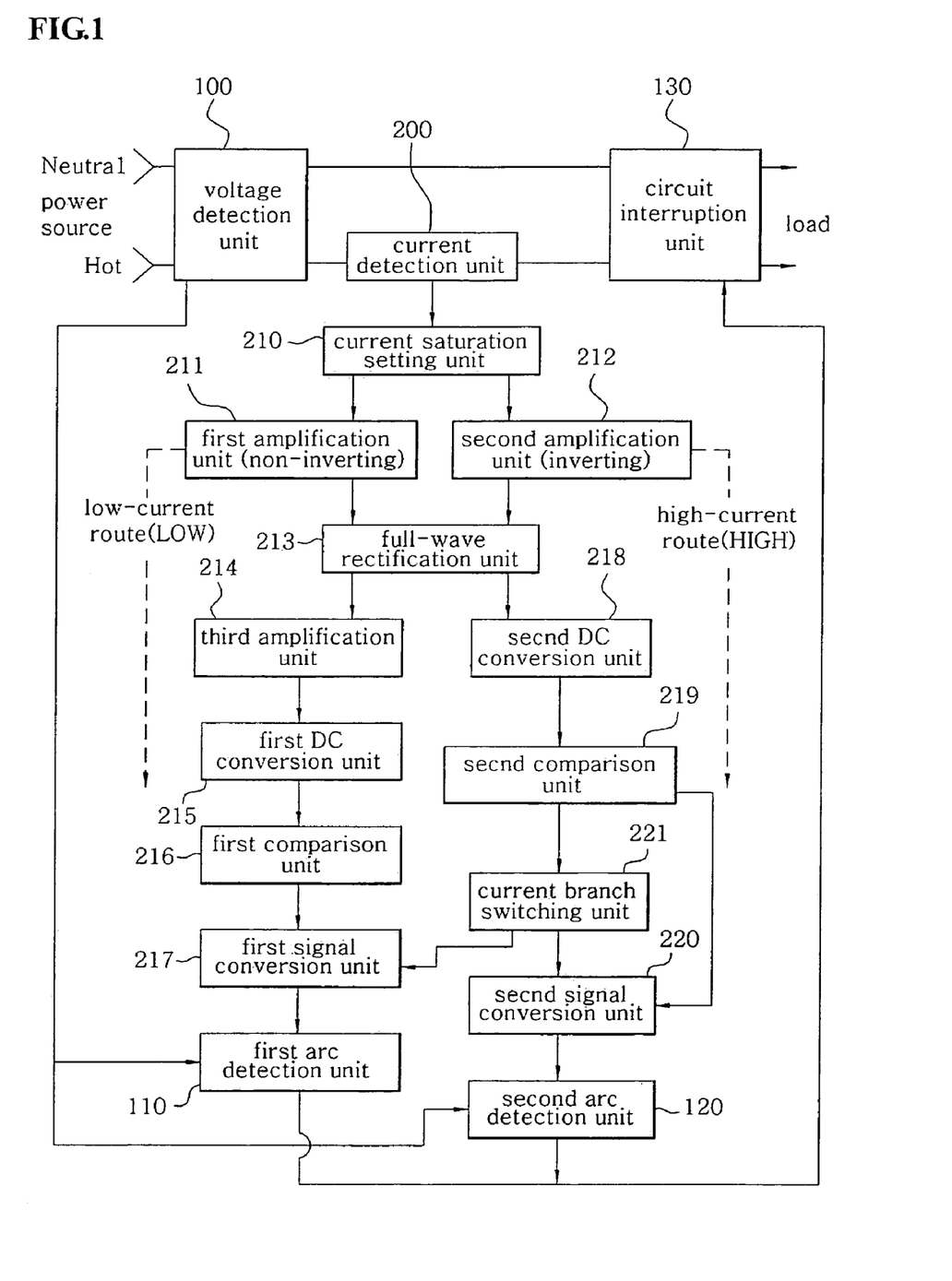
FIG. 1 is a block diagram showing a circuit for preventing a malfunction of an arc fault detection device according a first embodiment of the present invention.

FIG. 1 is a block diagram showing a circuit for preventing a malfunction of an arc fault detection device according a first embodiment of the present invention.

As shown in FIG. 1, the circuit for the arc fault detection device according the first embodiment of the present invention, the arc fault detection device including a voltage detection unit 100 for detecting variation in voltage over time for a power source, first and second arc detection units 110 and 120 for detecting whether an arc fault occurs through a low-current route (setting of a low-current frequency band) or a high current route (setting of a high current frequency band), based on the variation in voltage detected by the voltage detection unit 100, the first arc detection unit 110 outputting a corresponding arc detection signal when the arc detection is performed through the low-current route, and the second arc detection unit 120 outputting a corresponding arc detection signal when the arc detection is performed through the high current route, and a circuit interruption unit 130 for interrupting an electrical connection between the power source and a load in response to the arc detection signals output from the first and second arc detection units 110 and 120, includes a current detection unit 200, a current saturation setting unit 210, a first amplification unit 211, a second amplification unit 212, a full-wave rectification unit 213, a third amplification unit 214, a first Direct Current (DC) conversion unit 215, a first comparison unit 216, a first signal conversion unit 217, a second DC conversion unit 218, a second comparison unit 219, a second signal conversion unit 220, and a current branch switching unit 221.

The current detection unit 200 is disposed on a conductor 'Hot' between the power source and the load, and is configured to detect variation in current over time.

The current saturation setting unit 210 sets a current saturation time of the signal detected by the current detection unit 200 according to load. The current saturation setting unit 210 outputs the current signal detected by the current detection unit 210 at a magnitude proportional to the rated load current of the arc fault detection device.

In the case where a saturated signal, not a signal having a magnitude proportional to the rated load current, is output from the current saturation setting unit 210, and the first and second arc detection units 110 and 120 are controlled, there is no criterion for the input signals of the first and second comparison units 216 and 219, and an operation only for a specific load is possible, so that an operational range may be limited. Accordingly, setting a current saturation time depending on a load in the current saturation setting unit 210 is the most critical technical spirit of the present invention.

The first amplification unit 211 amplifies the signal output from the current saturation setting unit 210 in a non-inverted manner. An amplifier constituting the first amplification unit 211 does not use two power sources, but uses a single power source, for power supply voltage. Furthermore, the amplifier uses a negative power source −Vcc as a ground power source GND (0V), so that the current saturation setting unit 210 does not output a negative (−) voltage signal, but outputs only a half-wave signal, which is a positive (+) voltage signal.

The reason for this is to prevent the amplified output of the first amplification unit 211 from exceeding the power supply. Accordingly, portions higher than the power supply are all clipped, and a resulting signal is then output. For example, when a power source voltage of 12 V is used for the amplification units 211, an output voltage higher than 12 V is not generated. The amplification ratio between the first, second, and third amplification units 211, 212 and 214 is set such that the outputs thereof are not generated depending on the magnitude of an amplified output signal but are generated while not being clipped to the level of the rated load current of the arc fault detection device.

The second amplification unit 212 amplifies the signal output from the current saturation setting unit 210 in an inverted manner. Similarly to the first amplification unit 211, the amplifier of the second amplification unit 212 does not output a negative (−) voltage signal, but outputs only a half-wave signal, which is a positive (+) voltage signal.

The full-wave rectification unit 213 outputs a full-wave signal by combining half-wave signals output from the first and second amplification units 211 and 212.

The construction of the full-wave rectification unit 213 at the output stage of the above-described amplified signal is made to eliminate a phenomenon that a signal is attenuated or distorted by rectification devices (half-wave) because the signal output from a current transformer CT is minute in the case where a scheme of directly performing full-wave rectification using the current detection unit 200 is used like the conventional arc fault detection device.

The third amplification unit 214 amplifies the signal output from the full-wave rectification unit 213.

The first DC conversion unit converts the signal output from the third amplification unit 214 into a DC signal.

The first comparison unit 216 compares the signal output from the first DC conversion unit 215 with a first reference voltage, determines the output signal of the first DC conversion unit 215 to be the pseudo-arc signal of the low-current route when the output signal is lower than the first reference voltage, and generates an output based on the determination.

The first signal conversion unit 217 interrupts the output signal of the first arc detection unit 110 when the output based on the determination related to the pseudo-arc signal is generated by the first comparison unit 216.

The second DC conversion unit 218 converts the output signal of the full-wave rectification unit 213 into a DC signal.

The second comparison unit 219 compares the signal output from the second DC conversion unit 218 with a second reference voltage, determines the output signal of the second DC conversion unit 218 to be the pseudo-arc signal of the high-current route when the output signal is lower than the second reference voltage, and generates an output based on the determination.

The second signal conversion unit 220 interrupts the output signal of the second arc detection unit 120 when the output based on the determination related to the pseudo-arc signal is generated by the second comparison unit 219.

The current branch switching unit 221 is configured to interrupt the output of the first comparison unit 216 when an output resulting from the pseudo-arc signal is generated by the second comparison unit 219, and not to interrupt the output of the first comparison unit 216 when an output resulting from the pseudo-arc signal is not generated by the second comparison unit 219, after a current route is set according to low current or high current.

As a result, the current branch switching unit 221 performs a switching operation according to branch points depending on load current detection routes and causes only a single arc detection route to operate, so that a malfunction, such as unnecessary tripping, can be prevented.

Figure 2:
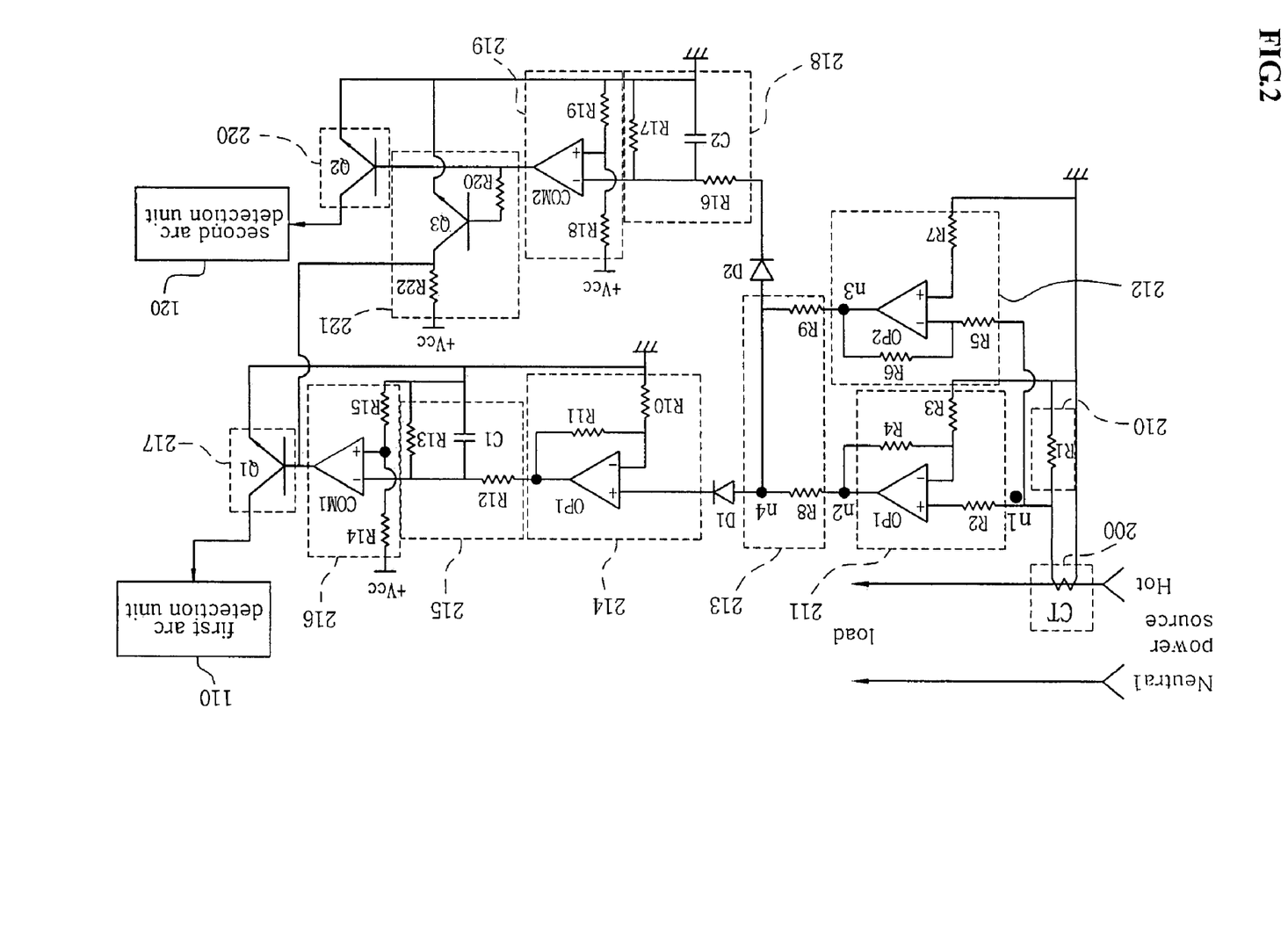
FIG. 2 is a detailed circuit diagram showing the construction of the circuit for preventing a malfunction of an arc fault detection device according to the first embodiment of the present invention.

With reference to FIG. 2, the construction of the malfunction preventing circuit according to the first embodiment of the present invention is described in detail below.

As shown in FIG. 2, the current detection unit 200 is composed of a current transformer CT, and the current transformer CT is disposed on a conductor 'Hot' between the power source and the load, and detects variation in current over time.

The current saturation setting unit 210 is composed of a resistor R1 connected in series to an end of the current transformer CT, and sets a saturation current value by adjusting the resistance value of the resistor R1.

The first amplification unit 211 is composed of resistors R2 to R4 and an amplifier OP1, and is configured such that a signal, which is set by the resistor R1 of the current saturation setting unit 210 and is output therethrough, is input to the non-inverting terminal (+) of the amplifier OP1 through a resistor R2, and the inverting terminal (−) of the amplifier OP1 is grounded through resistors R3 and R4.

The second amplification unit 212 is composed of resistors R5 to R7 and an amplifier OP2, and is configured such that a signal, which is set by the resistor R1 of the current saturation setting unit 210 and is output therethrough, is input to the inverting terminal (1) of the amplifier OP2 through resistors R5 and R6, and the non-inverting terminal (+) of the amplifier OP2 is grounded through a resistor R7.

The full-wave rectification unit 213 is composed of resistors R8 and R9, and performs full-wave rectification on half-wave signals, which are output from the first and second amplification units 211 and 212 and have a phase difference of 90° therebetween.

The third amplification unit 214 is composed of resistors R10 and R11 and an amplifier OP3, and is configured such that the output signal of the full-wave rectification unit 213 is input to the non-inverting terminal (+) of the amplifier OP3 via a diode D1, and the inverting terminal (−) of the amplifier OP3 is grounded through resistors R10 and R11.

The first conversion unit 215 is composed of resistors R12 and R13 and a capacitor C1, and is configured such that the output of the third amplification unit 214 is converted into a DC signal through the resistor R12, the capacitor C1 and the resistor R13.

The first comparison unit 216 is composed of resistors R14 and R15 and a comparator COM1, and is configured such that the signal output from the first DC conversion unit 215 is input to the inverting terminal (−) of the comparator COM1, and a reference voltage resulting from the voltage division of the resistors R14 and R15 is applied to the non-inverting terminal (+) of the comparator COM1.

The first signal conversion unit 217 is composed of a transistor Q1, and the transistor Q1 is turned on in response to the output of the first comparison unit 216.

The second DC conversion unit 218 is composed of resistors R16 and R17 and a capacitor C2, and is configured such that the signal of the second amplification unit 212, which is input through the full-wave rectification unit 213, passes through a diode D2 and is converted into DC current through the resistor R16, the capacitor C2 and the resistor R17.

The second comparison unit 219 is configured such that the signal output from the second DC conversion unit 217 is input to the inverting terminal (−) of the comparator COM2, and a reference voltage resulting from the voltage division of resistors R18 and R19 is applied to the non-inverting terminal (+) of a comparator COM2.

The second signal conversion unit 220 is composed of a transistor Q2, and the transistor Q2 is turned on in response to the output of the second comparison unit 219.

The current branch switching unit 221 is composed of resistors R20 and R22 and a transistor Q3, and is configured such that the output terminal of the second comparison unit 219 is connected to the base of the transistor Q3 through the resistor R20, and the collector of the transistor Q3 is connected to the base of the transistor Q1 of the first signal conversion unit 217.

The operation of the malfunction prevention circuit according to the first embodiment of the present invention is described below.

First, a current signal applied to a load through a power source is detected by the current transformer CT, that is, the current detection unit 200, and is then detected through the resistor R1 of the current saturation setting unit 210 in the form of an appropriate voltage.

In this case, a saturation current value is set by adjusting the value of the resistor R1, and the setting is appropriately made depending on the current conditions or state of the load.

Figure 3:
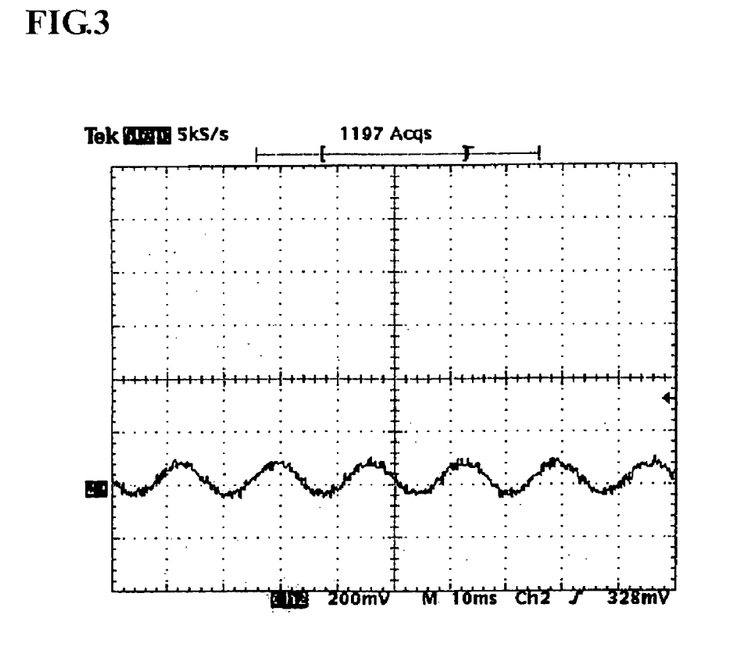
FIGS. 3 to 6 are waveform diagrams showing the outputs of the circuit for preventing a malfunction of an arc fault detection device according to the first embodiment of the present invention.

The output of the resistor R1 (node n1), as shown in FIG. 3, is a sinusoidal waveform having a low amplitude.

Figure 4:
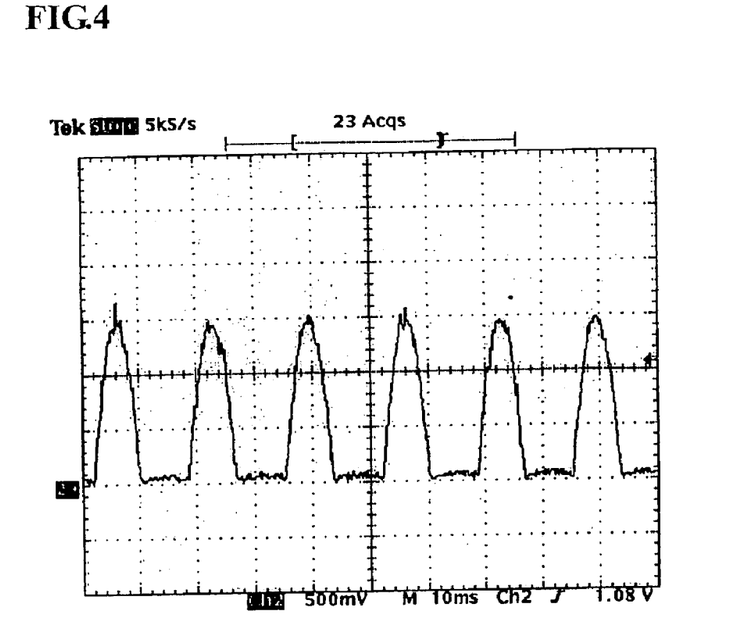

The output of the current saturation setting unit 210 is input to the non-inverting terminal (+) of the amplifier OP1 through the resistor R2, and the amplifier OP1, as shown in FIG. 4, outputs a half-rectified waveform that is amplified in a non-inverting form.

Figure 5:
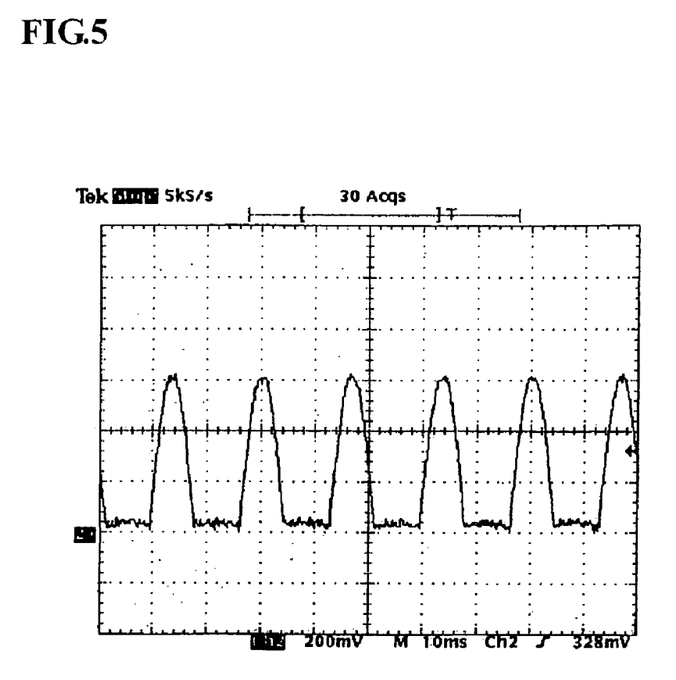

At the same time, the output of the current saturation setting unit 210 is input to the inverting terminal (−) of the amplifier OP2 through the resistor R5, and the output of the amplifier OP2, as shown in FIG. 5, is a half-rectified waveform that is inverted and amplified and has a phase difference of 90°, with respect to that of the amplifier OP1 (node n3).

Figure 6:
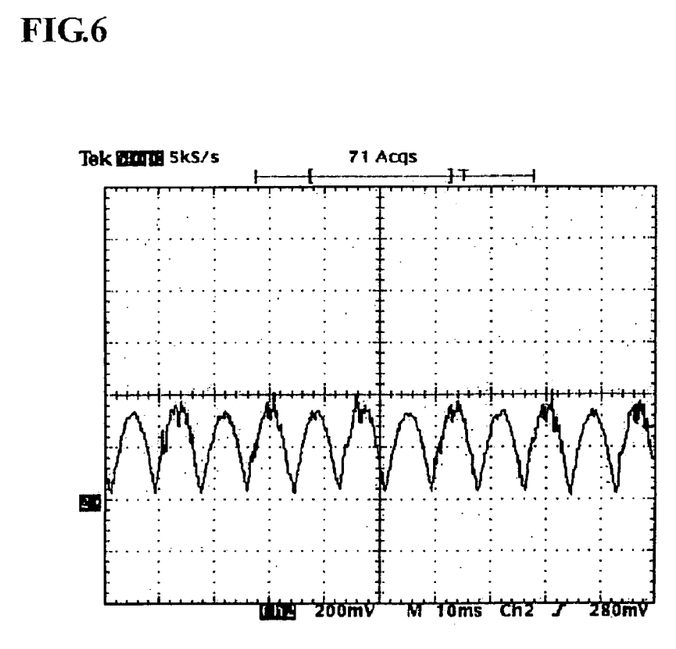

The outputs of the first and second amplification units 211 and 212, as shown in FIG. 6, are changed into a full-wave rectified waveform while passing through the resistors R8 and R9 of the full-wave rectification unit 213 (node n4).

The output of the full-wave rectification unit 213 is input to the non-inverting terminal (+) of the amplifier OP3 of the third amplification unit 214 via the diode D1, and the amplifier OP3 amplifies and outputs a signal entering into the low-current route.

The output of the third amplification unit 215 is converted into a DC signal using the resistors R12 and R13 and capacitor C1 of the first DC conversion unit 215, and is then output.

The output signal of the first DC conversion unit 215 is input to the inverting terminal (−) of the comparator COM1 of the first comparison unit 216. The comparator COM1 compares an input voltage with the reference voltage applied to the non-inverting terminal (+) thereof, and outputs a high-level signal when the input voltage is lower than the reference voltage.

As a result, when a pseudo-arc signal, not an arc signal, is detected at the time of signal detection of the low-current route (low load), the DC level of the first DC conversion unit 215 is more lowered than the level of the reference voltage, so that the comparator COM1 outputs a high-level signal.

When the comparator COM1 outputs a high-level signal, the transistor Q1, which is the first signal conversion unit 217, is turned on and, therefore, the output signal of the first arc detection unit 110 is interrupted. Accordingly, the pseudo-arc signal detected through the voltage detection unit 100 is mistaken for an arc signal, and the output of a circuit interruption command from the first arc detection unit 110 to the circuit interruption unit 130 is interrupted, so that the malfunction of causing the circuit interruption unit 130 to perform an unnecessary interruption operation can be prevented.

Meanwhile, the output signal of the second amplification unit 212, which is input through the full-wave rectification unit 213 and the diode D2, is converted into a DC signal using the resistor R16, capacitor C2 and resistor R17 of the second DC conversion unit 218 and is then output.

The output signal of the second DC conversion unit 218 is input to the inverting terminal (−) of the comparator COM2 of the second comparison unit 219. The comparator COM2 compares an input voltage with the reference voltage applied to the non-inverting terminal (+) thereof, and outputs a high-level signal when the input voltage is lower than the reference voltage.

As a result, when a pseudo-arc signal, not an arc signal, is detected at the time of signal detection of the high-current route (high load), the DC level of the second DC conversion unit 215 is more lowered than the level of the reference voltage, so that the comparator COM2 outputs a high-level signal.

When the comparator COM2 outputs a high-level signal, the transistor Q2, which is the second signal conversion unit 220, is turned on and, therefore, the output signal of the second arc detection unit 120 is interrupted. Accordingly, the pseudo-arc signal detected through the voltage detection unit 100 is mistaken for an arc signal and the output of a circuit interruption command from the second arc detection unit 120 to the circuit interruption unit 130 is interrupted, so that the malfunction of causing the circuit interruption unit 130 to perform an unnecessary interruption operation can be prevented.

Furthermore, when the comparator COM2 outputs a high-level signal, the transistor Q3 is turned on in response to a signal input through the resistor R20 of the current branch switching unit 221 and, therefore, the transistor Q1 of the first signal conversion unit 217 is turned off.

The current branch switching unit 221 interrupts the output of the first comparison unit 216 when an output resulting from the pseudo-arc signal is generated by the second comparison unit 219, after a current route is set according to low current or high current, that is, causes a single arc detection route to operate, so that a malfunction, such as unnecessary tripping, can be prevented.

Figure 7:
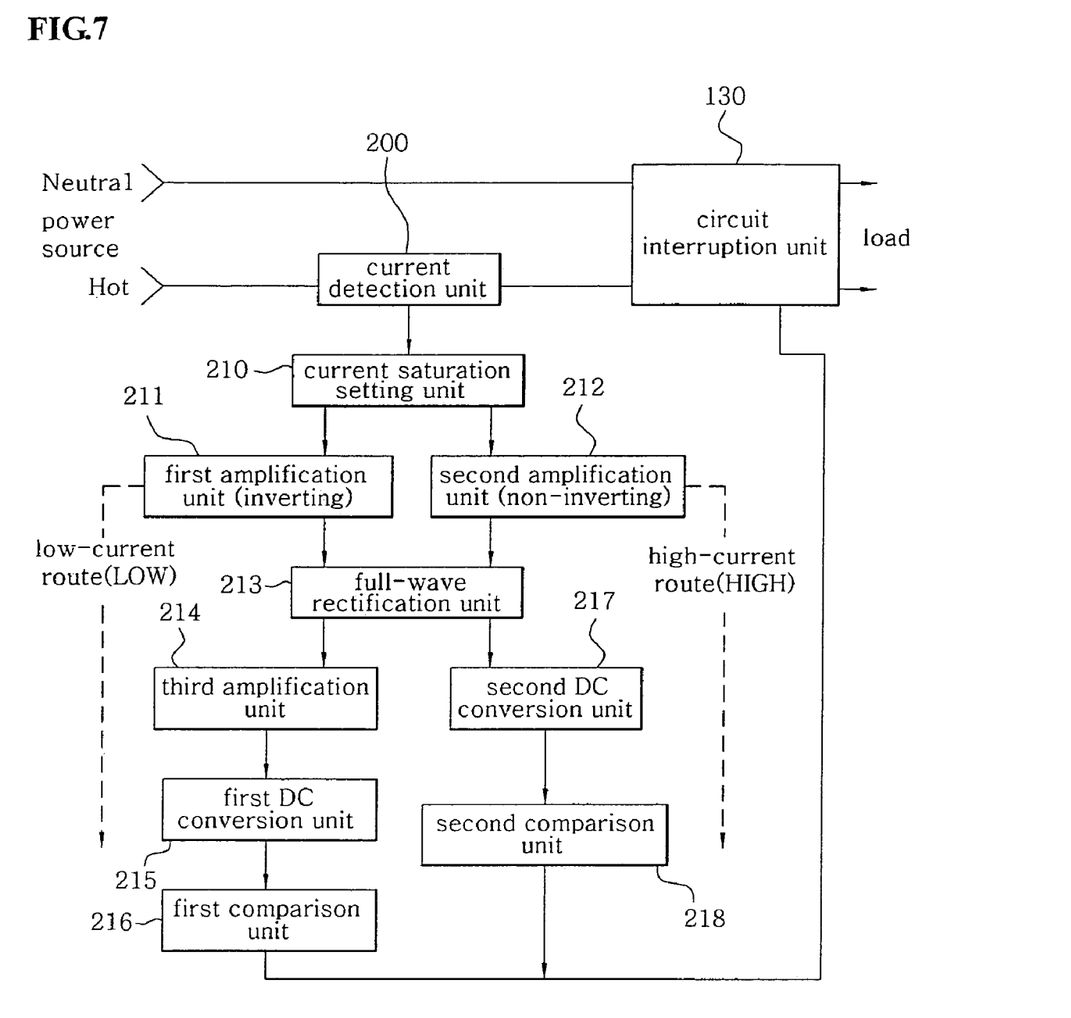
FIG. 7 is a circuit diagram showing the construction of an overload detection device according to a second embodiment of the present invention.

FIG. 7 is a circuit diagram showing the construction of an overload detection device according to a second embodiment of the present invention.

The overload detection device according to the second embodiment of the present invention can be used for a circuit for preventing a malfunction of an arc fault detection device that enables the implementation of an AFCI, which must include a function of detecting an overload or a short circuit based on a specification, as well as a function of detecting the arc signal.

Furthermore, the circuit is based on a scheme of preventing overload and short using a circuit method, not a mechanical (bimetal) method.

The present invention uses the same reference numerals to designate components performing the same function.

As shown in FIG. 7, the second embodiment of the present invention includes a current detection unit 200, a current saturation detection unit 210, a first amplification unit 211, a second amplification unit 212, a full-wave rectification unit 213, a third amplification unit 214, a first DC conversion unit 215, a first comparison unit 216, a second DC conversion unit 218, and a second comparison unit.

The current detection unit 200 is disposed on a conductor 'Hot' between the power source and the load, and is configured to detect variation in current over time.

The current saturation setting unit 210 sets a current saturation time of the signal detected by the current detection unit 200 according to load. The current saturation setting unit 210 outputs the current signal detected by the current detection unit 210 at a magnitude proportional to the rated load current of the arc fault detection device.

The first amplification unit 211 amplifies the signal output from the current saturation setting unit 210 in a non-inverted manner.

The second amplification unit 212 amplifies the signal output from the current saturation setting unit 210 in an inverted manner.

The full-wave rectification unit 213 outputs a full-wave signal by combining half-wave signals output from the first and second amplification units 211 and 212.

The third amplification unit 214 amplifies the signal output from the full-wave rectification unit 213.

The first DC conversion unit 215 converts the signal output from the third amplification unit 214 into a DC signal.

The first comparison unit 216 compares the signal output from the first DC conversion unit 215 with a first reference voltage, determines that an overload has occurred over a low-current route, that is, that an overload has occurred over a low load route if a current equal to or lower than 200% of a rated current is detected, when an output signal of the first DC conversion unit 215 is lower than the first reference voltage, and outputs an circuit interruption signal.

The second DC conversion unit 218 converts the output signal of the full-wave rectification unit 213 into a DC signal.

The second comparison unit 219 compares the signal output from the second DC conversion unit 218 with a second reference voltage, determines that an overload has occurred over a high-current route, that is, that an overload has occurred over a high load route if a current ranging from 200% to 400% of a rated current is detected, when the output signal of the second DC conversion unit 218 is lower than the second reference voltage, and outputs an circuit interruption signal.

Since the operation of the overload detection device according to the second embodiment of the present invention is similar to the malfunction preventing circuit according to the first embodiment of the present invention, a description thereof is omitted.

As described above, in the arc fault detection unit that determines whether an arc fault occurs through a low-current route or a high-current route classified according to the magnitude of load current, using a source voltage applied to a conductor, the present invention sets an operational prohibition range so as to prevent the malfunction of determining a pseudo-arc signal attributable to various combinations of loads to be an actual arc signal and interrupting a circuit, thus being capable of more precisely controlling the detection of the arc signal.

Furthermore, the present invention enables the implementation of an AFCI, which must include a function of detecting an overload or a short circuit as well as a function of detecting the arc signal according to regulations.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A circuit for preventing a malfunction of an arc fault detection device, the arc fault detection device having a voltage detection unit for detecting variation in voltage over time for a power source, first and second arc detection units for detecting whether an arc fault occurs through a low-current route (setting of a low-current frequency band) or a high current route (setting of a high current frequency band), based on the variation in voltage detected by the voltage detection unit, the first arc detection unit outputting a corresponding arc detection signal when the arc detection is performed through the low-current route, and the second arc detection unit outputting a corresponding arc detection signal when the arc detection is performed through the high current route, and a circuit interruption unit for interrupting an electrical connection between the power source and a load in response to the arc detection signals output from the first and second arc detection units, the circuit comprising:
    a current detection unit disposed on a conductor between the power source and the load, and configured to detect variation in current over time;
    a current saturation setting unit for setting a current saturation time of the signal detected by the current detection unit according to load;
    a first amplification unit for amplifying a signal output from the current saturation setting unit in a non-inverted manner;
    a second amplification unit for amplifying a signal output from the current saturation setting unit in an inverted manner;
    a full-wave rectification unit for outputting a full-wave signal by combining half-wave signals output from the first and second amplification units;
    a third amplification unit for amplifying the signal output from the full-wave rectification unit;
    a first Direct Current (DC) conversion unit for converting a signal output from the third amplification unit into a DC signal;
    a first comparison unit for comparing the signal output from the first DC conversion unit with a first reference voltage, determining the output signal of the first DC conversion unit to be a pseudo-arc signal of the low-current route when the output signal is lower than the first reference voltage, and generating an output based on the determination;
    a first signal conversion unit for interrupting the output signal of the first arc detection unit when the output based on the determination related to the pseudo-arc signal is generated by the first comparison unit;
    a second DC conversion unit for converting the output signal of the full-wave rectification unit into a DC signal;
    a second comparison unit for comparing the signal output from the second DC conversion unit with a second reference voltage, determining the output signal of the second DC conversion unit to be a pseudo-arc signal of the high-current route when the output signal is lower than the second reference voltage, and generating an output based on the determination;

a second signal conversion unit for interrupting the output signal of the second arc detection unit when the output based on the determination related to the pseudo-arc signal is generated by the second comparison unit; and a current branch switching unit configured to interrupt an output of the first comparison unit when an output resulting from the pseudo-arc signal occurs from the second comparison unit, and not to interrupt the output of the first comparison unit when an output resulting from the pseudo-arc signal does not occur from the second comparison unit, after a current route is set according to low current or high current.

2. The circuit as set forth in claim 1, wherein amplifiers constituting the first amplification unit and the second amplification unit share a single power source for power supply voltage.

3. The circuit as set forth in claim 1, wherein the current saturation setting unit comprises a resistor that is connected in series to an end of a current transformer.

4. The circuit as set forth in claim 1, wherein the first amplification unit is configured such that a signal, which is set by a first resistor of the current saturation setting unit and output therethrough, is input to a non-inverting terminal of an amplifier through a second resistor, and an inverting terminal of the amplifier is grounded through third and fourth resistors.

5. The circuit as set forth in claim 1, wherein the second amplification unit is configured such that a signal, which is set by a first resistor of the current saturation setting unit and output therethrough, is input to an inverting terminal of a second amplifier through fifth and sixth resistors, and a non-inverting terminal of the second amplification is ground through a seventh resistor.

6. A circuit for preventing a malfunction of an arc fault detection device, the circuit comprising:

a current detection unit disposed on a conductor between the power source and the load and configured to detect variation in current over time;

a current saturation setting unit for setting a current saturation time of the signal detected by the current detection unit according to load;

a first amplification unit for amplifying a signal output from the current saturation setting unit in a non-inverted manner;

a second amplification unit for amplifying a signal output from the current saturation setting unit in an inverted manner;

a full-wave rectification unit for outputting a full-wave signal by combining half-wave signals output from the first and second amplification units;

a third amplification unit for amplifying the signal output from the full-wave rectification unit;

a first DC conversion unit for converting a signal output from the third amplification unit into a DC signal;

a first comparison unit for comparing the signal output from the first DC conversion unit with a first reference voltage, determining that an overload has occurred over a low-current route, that is, that an overload has occurred over a low load route if a current equal to or lower than 200% of a rated current is detected, when an output signal of the first DC conversion unit is lower than the first reference voltage, and outputting an circuit interruption signal;

a second DC conversion unit for converting the output signal of the full-wave rectification unit in a DC signal; and a second comparison unit for comparing the signal output from the second DC conversion unit with a second reference voltage, determining that an overload has occurred over a high-current route when a current ranging from 200% to 400% of the rated current is detected, when an output signal of the second DC conversion unit is lower than the second reference voltage, and outputting an circuit interruption signal.

* * * * *